United States Patent

Paoletta, Jr.

Patent Number: 5,517,781
Date of Patent: May 21, 1996

[54] SCENT DISPENSING WORM LURE

[76] Inventor: Anthony P. Paoletta, Jr., 1917 Paulette Rd., Morehead City, N.C. 28557

[21] Appl. No.: 340,605
[22] Filed: Nov. 16, 1994
[51] Int. Cl.⁶ .................................................... A01K 85/01
[52] U.S. Cl. ........................................ 43/42.06; 43/42.24
[58] Field of Search ............................... 43/42.06, 42.24, 43/42.26

[56] References Cited

U.S. PATENT DOCUMENTS

| | | | |
|---|---|---|---|
| 2,129,245 | 9/1938 | Stenstrom | 43/42.06 |
| 3,108,389 | 10/1963 | McGuire | 43/42.06 |
| 4,197,667 | 4/1980 | Helfenstine et al. | 43/42.06 |
| 4,592,161 | 6/1986 | Smith et al. | 43/42.24 |

FOREIGN PATENT DOCUMENTS 344908   11/1904   France ................... 43/42.06

Primary Examiner—Jack W. Lavinder
Assistant Examiner—Jeanne M. Elpel

[57] ABSTRACT

A worm lure for dispensing a scented fluid to attract fish. The inventive device includes a worm body having a center fluid reservoir extending therethrough for receiving a supply of scented fluid. A plurality of lateral reservoirs communicate with the center fluid reservoir to dispense the scented fluid through a plurality of apertures in the worm body. The worm body is constructed of a resilient material such that a fish bite will compress the center fluid reservoir to dispense the scented fluid therefrom through the apertures. Further, the worm body is shaped so as to define a plurality of arcuate contours over which the surrounding water is accelerated to draw the scented fluid in small amounts from the apertures through the venturi effect.

1 Claim, 2 Drawing Sheets

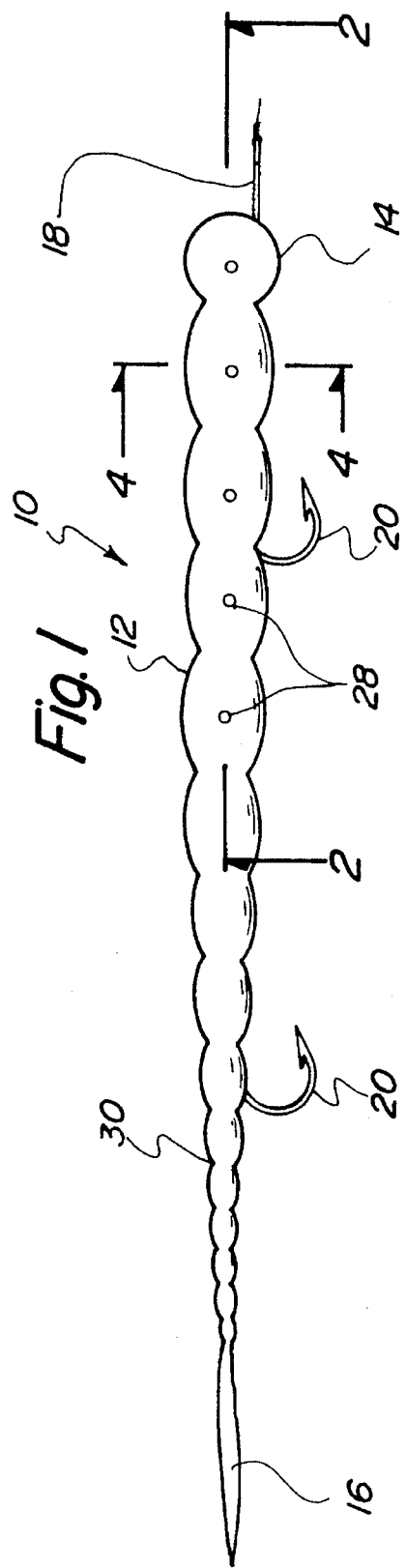
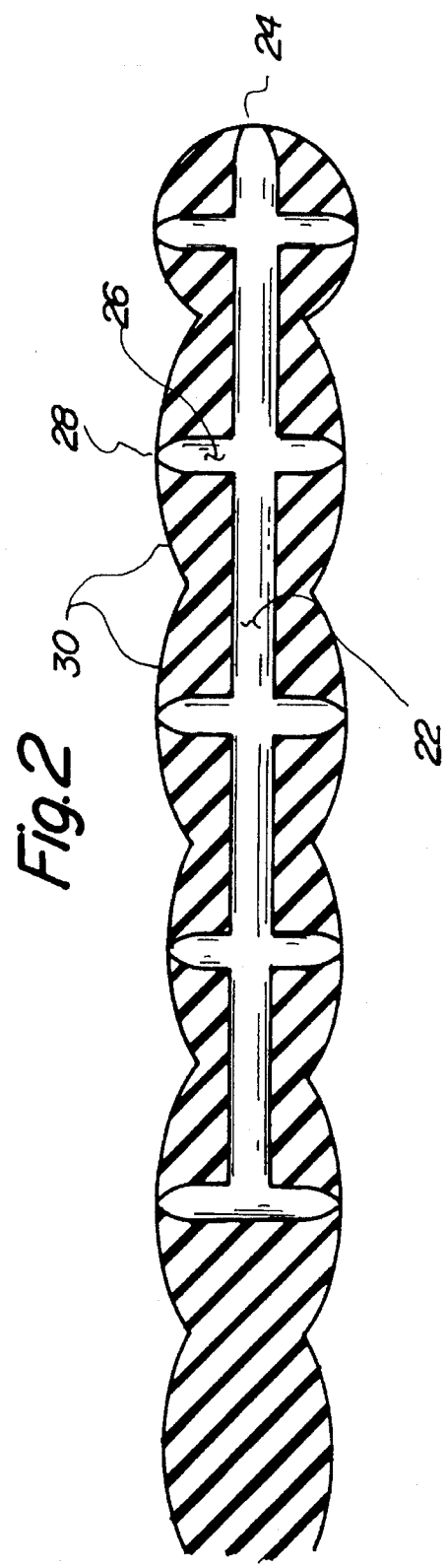

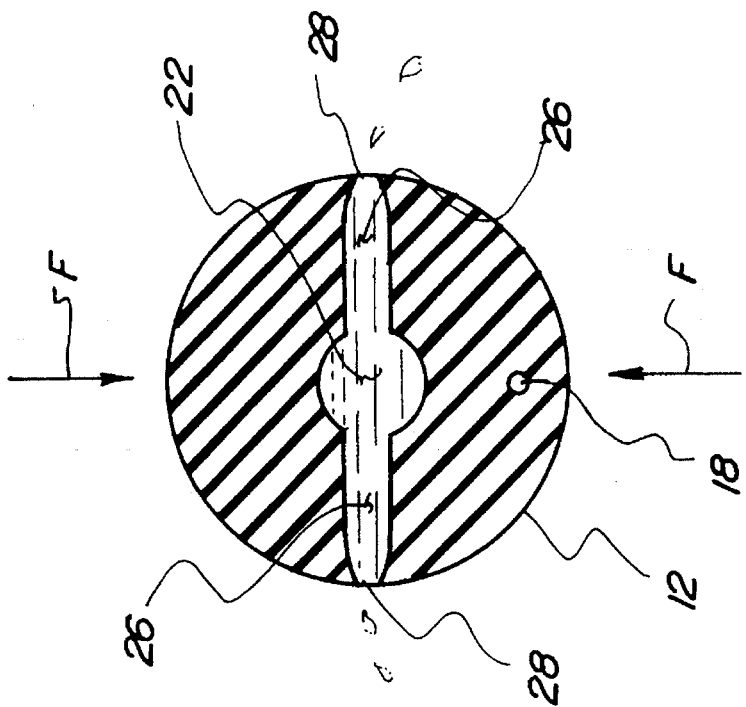
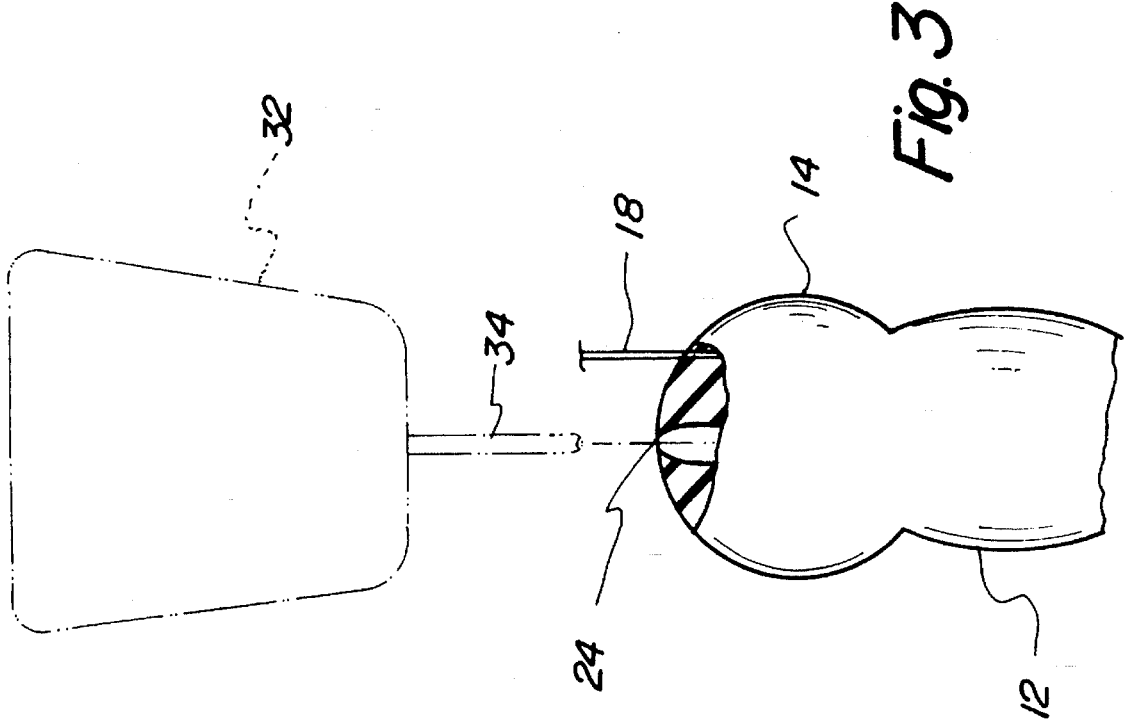

SCENT DISPENSING WORM LURE

BACKGROUND OF THE INVENTION

1. Field of the Invention

The present invention relates to fishing lure structures and more particularly pertains to a scent dispensing worm lure for dispensing a scented fluid to attract fish.

2. Description of the Prior Art

The use of fishing lure structures is known in the prior art. More specifically, fishing lure structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing lure structures include U.S. Pat. No. 4,839,982; U.S. Pat. No. 4,602,453; U.S. Pat. No. 4,050,181; U.S. Pat. No. 4,044,490; U.S. Pat. No. 3,953,934; and U.S. Pat. No. 3,760,528.

While these devices fulfill their respective, particular objectives and requirements, the aforementioned patents do not disclose a scent dispensing worm lure for dispensing a scented fluid to attract fish which includes a worm body having a center fluid reservoir extending therethrough for receiving a supply of scented fluid, and a plurality of lateral reservoirs communicating with the center fluid reservoir to dispense the scented fluid through a plurality of apertures in the worm body. Furthermore, none of the known prior art fishing lure structures teach or suggest a scent dispensing worm lure of the aforementioned structure in which the worm body is constructed of a resilient material such that a fish bite will compress the center fluid reservoir to dispense the scented fluid therefrom through the apertures. Moreover, none of the known prior art disclosed a scent dispensing worm lure of the aforementioned structure in which the worm body is shaped so as to define a plurality of arcuate contours over which the surrounding water is accelerated to draw the scented fluid in small amounts from the apertures through the venturi effect.

In these respects, the scent dispensing worm lure according to the present invention substantially departs from the conventional concepts and designs of the prior art, and in so doing provides an apparatus primarily developed for the purpose of dispensing a scented fluid to attract fish.

SUMMARY OF THE INVENTION

In view of the foregoing disadvantages inherent in the known types of fishing lure structures now present in the prior art, the present invention provides a new scent dispensing worm lure construction wherein the same can be utilized for dispensing a scented fluid to attract fish. As such, the general purpose of the present invention, which will be described subsequently in greater detail, is to provide a new scent dispensing worm lure apparatus and method which has many of the advantages of the fishing lure structures mentioned heretofore and many novel features that result in a scent dispensing worm lure which is not anticipated, rendered obvious, suggested, or even implied by any of the prior art fishing lure structures, either alone or in any combination thereof.

To attain this, the present invention generally comprises a worm lure for dispensing a scented fluid to attract fish. The inventive device includes a worm body having a center fluid reservoir extending therethrough for receiving a supply of scented fluid. A plurality of lateral reservoirs communicate with the center fluid reservoir to dispense the scented fluid through a plurality of apertures in the worm body. The worm body is constructed of a resilient material such that a fish bite will compress the center fluid reservoir to dispense the scented fluid therefrom through the apertures. Further, the worm body is shaped so as to define a plurality of arcuate contours over which the surrounding water is accelerated to draw the scented fluid in small amounts from the apertures through the venturi effect.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new scent dispensing worm lure apparatus and method which has many of the advantages of the fishing lure structures mentioned heretofore and many novel features that result in a scent dispensing worm lure which is not anticipated, rendered obvious, suggested, or even implied by any of the prior art fishing lure structures, either alone or in any combination thereof.

It is another object of the present invention to provide a new scent dispensing worm lure which may be easily and efficiently manufactured and marketed.

It is a further object of the present invention to provide a new scent dispensing worm lure which is of a durable and reliable construction.

An even further object of the present invention is to provide a new scent dispensing worm lure which is susceptible of a low cost of manufacture with regard to both materials and labor, and which accordingly is then susceptible of low prices of sale to the consuming public, thereby making such scent dispensing worm lures economically available to the buying public.

Still yet another object of the present invention is to provide a new scent dispensing worm lure which provides in the apparatuses and methods of the prior art some of the advantages thereof, while simultaneously overcoming some of the disadvantages normally associated therewith.

Still another object of the present invention is to provide a new scent dispensing worm lure for dispensing a scented fluid to attract fish.

Yet another object of the present invention is to provide a new scent dispensing worm lure which includes a worm body having a center fluid reservoir extending therethrough for receiving a supply of scented fluid, and a plurality of lateral reservoirs communicating with the center fluid reservoir to dispense the scented fluid through a plurality of apertures in the worm body.

Even still another object of the present invention is to provide a new scent dispensing worm lure of the aforementioned structure in which the worm body is constructed of a resilient material such that a fish bite will compress the center fluid reservoir to dispense the scented fluid therefrom through the apertures.

Even still yet another object of the present invention is to provide a new scent dispensing worm lure of the aforementioned structure in which the worm body is shaped so as to define a plurality of arcuate contours over which the surrounding water is accelerated to draw the scented fluid in small amounts from the apertures through the venturi effect.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevation view of a scent dispensing worm lure according to the present invention.

FIG. 2 is a cross-sectional view taken along line 2—2 of FIG. 1.

FIG. 3 is a side elevation view, partially in cross section, of a portion of the present invention.

FIG. 4 is a further cross-sectional view taken along line 4—4 of FIG. 1.

DESCRIPTION OF THE PREFERRED EMBODIMENT

With reference now to the drawings, and in particular to FIGS. 1–4 thereof, a new scent dispensing worm lure embodying the principles and concepts of the present invention and generally designated by the reference numeral 10 will be described.

More specifically, it will be noted that the scent dispensing worm lure 10 comprises a substantially elongated worm body 12 having a spherical head 14 tapering to a tail 16. As shown in FIG. 1, the spherical head 14 is of a first diameter and the tail 16 is of a second diameter, wherein the first diameter is substantially greater than the second diameter so as to define the tapered shape of the worm body 12. The worm body 12 is constructed of a substantially resilient and flexible material which permits articulation of the worm body along a longitudinal length thereof to simulate the motion of a worm when the device 10 is pulled through water or other fluids. A shank 18 extends into the worm body 12 through a forward end of the spherical head 14 and mounts at least one hook 20 along a longitudinal length of the worm body 12. The hook 20 can be positioned exteriorly of the worm body 12 or interiorly thereof in a "Texas-Rig" or "Weedless" Configuration.

As shown in FIGS. 2 and 4, the worm body 12 is shaped so as to define a center fluid reservoir 22 extending at least partially along a longitudinal length therewithin and operable to contain a scented fluid for dispensing. The center fluid reservoir 22 is in fluid communication with a filling aperture 24 formed at a forward end of the spherical head 14. Further, a plurality of lateral reservoirs 26 extend from the center fluid reservoir 22 to communicate with dispensing apertures 28 formed through an exterior of the worm body 12. The worm body 12 is further shaped so as to define a plurality of arcuate contours 30 extending along a longitudinal length thereof, with each of the dispensing apertures 28 being directed through a peak of each of the arcuate contours. Although the dispensing apertures 28 are illustrated in FIG. 1 in an open configuration, the resilient material of the worm body 12 can be configured so as to close the dispensing apertures absent a pressure differential thereacross. In other words, the dispensing apertures 28 can be configured to be in a normally closed configuration, wherein a pressure differential across the dispensing apertures will result in a slight opening thereof to dispense the scented fluid from the center fluid reservoir 22 through the lateral reservoirs 26. The filling aperture 24 can also be normally closed and can be biased open, as shown in FIG. 3, to receive the scented fluid from a scent container 32 having a nozzle 34 which can be projected through the filling aperture 24.

To utilize the present invention 10 with a scented fluid in the form of a gel, the dispensing apertures of the worm body can be shaped so as to be in a normally open configuration to permit direct dispensing of the scented fluid gel therefrom. With the dispensing apertures configured to be in a normally open configuration, a pressure differential across the dispensing apertures will result in a pressurized biasing of the scented fluid gel from the center fluid reservoir 22 through the lateral reservoirs 26 to increase the dispensing thereof. Thus, should the apertures be configured in either the open or closed configuration, a pressure differential created across the dispensing apertures will increase a flow of the scented fluid or gel from the device 10.

As shown in FIG. 4, and by virtue of the resilient nature of the worm body 12, a force "F" generated by a fish bite or the like will compress the center fluid reservoir 22 to force the scented fluid through the lateral reservoirs 26 and out of the dispensing apertures 28. Such dispensing of the scented fluid in response to the fish bite, serves to further convince the fish that the worm lure 10 is a live worm. In other words, the dispensing of the scented fluid in response to the compression of the worm body 12 serves to mimic a dispensing of bodily fluids from a real worm in response to such a fish bite.

In addition to responding to the force "F" of a fish bite, the present invention 10 also dispenses a scented fluid in smaller amounts during trolling or pulling of the lure through a body of water. To this end, the arcuate contours 30 extending along the worm body 12 serve to accelerate the fluid or water passing longitudinally along the worm body to create a venturi effect pressure differential between the center fluid reservoir 22 and the exterior of the worm body. The pressure differential created by the venturi effect causes a pressure induced biasing of the scented fluid from the center fluid reservoir 22 through the lateral reservoirs 26 and out of the worm body through the dispensing apertures 28. By this structure, smaller amounts of the scented fluid are dispensed to attract fish or the like during use of the scent dispensing worm lure 10 as described above.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A scent dispensing lure comprising:

an elongated body constructed of a substantially resilient and flexible material, the body being shaped so as to define a center fluid reservoir extending at least partially along a longitudinal length therewithin and operable to contain a scented fluid for dispensing, the body being further shaped so as to define a plurality of lateral reservoirs extending from the center fluid reservoir, the plurality of lateral reservoirs positioned along the entire length of the center fluid reservoir, and a plurality of dispensing apertures extending from exteriorly of the body to communicate with the lateral reservoirs, the dispensing apertures being configured such that a pressure differential across the dispensing apertures will result in a dispensing of a scented fluid, whereby a force generated by a fish bite will compress the center fluid reservoir to force a scented fluid through the lateral reservoirs and out of the dispensing apertures, the body being further shaped so as to define a plurality of arcuate contours extending along a longitudinal length thereof, with each of the dispensing apertures being directed through a peak of a respective arcuate contour such that the arcuate contours extending along the body serve to accelerate fluid passing longitudinally along the body to create a venturi effect pressure differential between the center fluid reservoir and an exterior of the body, thereby effecting a pressure induced biasing of a scented fluid through the lateral reservoirs and out of the dispensing apertures, the body being further defined so as to define a filling aperture in communication with the center fluid reservoir, the filling aperture being in a normally closed configuration, whereby the filling aperture can be biased open to receive a scented fluid from a scent container having a nozzle projected through the filling aperture;

a shank extending into the body through a forward end thereof; and a plurality of hooks coupled to the shank and projecting exteriorly from the body.

\* \* \* \* \*